(12) United States Patent
Jia et al.

(10) Patent No.: US 11,687,233 B2
(45) Date of Patent: Jun. 27, 2023

(54) HANDWRITING PROCESSING METHOD, TOUCH DISPLAY DEVICE, COMPUTER DEVICE AND STORAGE MEDIUM

(71) Applicant: BOE TECHNOLOGY GROUP CO., LTD., Beijing (CN)

(72) Inventors: Honghong Jia, Beijing (CN); Rui Zheng, Beijing (CN); Ruibin Xue, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/763,181

(22) PCT Filed: Apr. 29, 2021

(86) PCT No.: PCT/CN2021/090995
§ 371 (c)(1),
(2) Date: Mar. 23, 2022

(87) PCT Pub. No.: WO2021/219082
PCT Pub. Date: Nov. 4, 2021

(65) Prior Publication Data
US 2022/0357843 A1    Nov. 10, 2022

(30) Foreign Application Priority Data
Apr. 30, 2020    (CN) .......................... 202010361395.3

(51) Int. Cl.
*G06F 3/04883*    (2022.01)
*G06V 30/32*    (2022.01)
(Continued)

(52) U.S. Cl.
CPC ...... *G06F 3/04883* (2013.01); *G06F 3/03545* (2013.01); *G06F 3/0418* (2013.01); *G06V 30/347* (2022.01)

(58) Field of Classification Search
CPC .............. G06F 3/03545; G06F 3/0418; G06F 3/04883; G06V 30/347
See application file for complete search history.

(56) References Cited

U.S. PATENT DOCUMENTS

2012/0299931 A1* 11/2012 Monahan ............ G06F 3/04883
345/173
2014/0081610 A1* 3/2014 DiVerdi .............. G06F 3/03545
703/6
2015/0346995 A1    12/2015 Sugiura

FOREIGN PATENT DOCUMENTS

CN    101699518 A    4/2010
CN    102937849 A    2/2013
(Continued)

OTHER PUBLICATIONS

China Patent Office, First Office Action dated Dec. 18, 2020 for application No. CN202010361395.3.

*Primary Examiner* — Michael Pervan
(74) *Attorney, Agent, or Firm* — Houtteman Law LLC

(57) ABSTRACT

A handwriting processing method, a touch display device, a computer device, and a storage medium are provided. The handwriting processing method includes: determining, according to a sample point in a writing track that is input by a user by means of a touch display, a group of track points and a related parameter of each track point, the related parameter including a coordinate parameter and a time parameter; determining, according to the related parameter of each track point, a start position, an end position, and a type of a stroke contained in the writing track, where the type of the stroke includes one of a horizontal stroke, a vertical stroke, a left-falling stroke, a right-falling stroke or a lifting stroke; and determining, according to the type of the stroke, a shape of the start position of the stroke.

20 Claims, 8 Drawing Sheets

(51) Int. Cl.
     *G06F 3/0354*     (2013.01)
     *G06F 3/041*      (2006.01)

(56) References Cited

FOREIGN PATENT DOCUMENTS

| | | | |
|---|---|---|---|
| CN | 103310474 | A | 9/2013 |
| CN | 105046730 | A | 11/2015 |
| CN | 108334270 | A | 7/2018 |
| CN | 109445887 | A | 3/2019 |
| CN | 109461194 | A | 3/2019 |
| CN | 109840034 | A | 6/2019 |
| CN | 110531875 | A | 12/2019 |
| CN | 110851071 | A | 2/2020 |
| CN | 111381754 | A | 7/2020 |

* cited by examiner

HANDWRITING PROCESSING METHOD, TOUCH DISPLAY DEVICE, COMPUTER DEVICE AND STORAGE MEDIUM This is a National Phase Application filed under 35 U.S.C. 371 as a national stage of PCT/CN2021/090995 filed on Apr. 29, 2021, an application claiming priority from Chinese patent application No. 202010361395.3 filed on Apr. 30, 2020, the entirety of each of which is incorporated herein by reference.

TECHNICAL FIELD

The present disclosure relates to the field of handwriting display technology, and more specifically, relates to a handwriting processing method, a touch display device, a computer device, and a computer-readable storage medium.

BACKGROUND

With the rapid development of information technology, the handwriting pen or finger input technology is getting more and more attention, and brings about increasing requirements on user experience. On the basis that a writing track of a handwriting pen (e.g., a stylus) or a finger can be accurately identified, the writing experience of using the handwriting pen by a user can be greatly improved if the handwriting has an attractive stroke end effect (i.e., a representation effect of a starting end and/or an ending end of a stroke).

SUMMARY

Some embodiments of the present disclosure provide a handwriting processing method, a touch display device, a computer device, and a non-transitory computer-readable storage medium.

A first aspect of the present disclosure provides a handwriting processing method, including:

determining, according to a sample point in a writing track that is input by a user by means of a touch display, a group of track points and a related parameter of each track point, the related parameter including a coordinate parameter and a time parameter;

determining, according to the related parameter of each track point, a start position, an end position, and a type of a stroke contained in the writing track, where the type of the stroke includes one of a horizontal stroke, a vertical stroke, a left-falling stroke, a right-falling stroke or a lifting stroke; and determining, according to the type of the stroke, a shape of the start position of the stroke.

In an embodiment, the determining, according to the type of the stroke, the shape of the start position of the stroke includes:

enabling the start position of the stroke to appear an ellipse shape corresponding to the type of the stroke.

In an embodiment, the enabling the start position of the stroke to appear the ellipse shape corresponding to the type of the stroke includes:

assuming that the stroke contains N track points, taking a position of a first track point of the N track points as the start position of the stroke, where N is an integer greater than or equal to 2;

enabling, for a horizontal stroke, the start position to appear an ellipse shape with a central point at the position of the first track point, a long axis having a length of 1.5*w, a short axis having a length of w, and the long axis rotated clockwise by 25° to 35° from being parallel to an x axis, where w is a preset line width value of the writing track;

enabling, for a vertical stroke, the start position to appear an ellipse shape with a central point at the position of the first track point, a long axis having a length of 2.5*w, a short axis having a length of w, and the long axis rotated clockwise by 45° to 55° from being parallel to the x axis;

enabling, for a left-falling stroke, the start position to appear an ellipse shape with a central point at the position of the first track point, a long axis having a length of 2*w, a short axis having a length of w, and the long axis rotated clockwise by 70° to 80° from being parallel to the x axis;

enabling, for a right-falling stroke, the start position to appear an ellipse shape with a central point at the position of the first track point, a long axis having a length of 3.5*w, a short axis having a length of 0.8*w, and the long axis rotated clockwise by 40° to 50° from being parallel to the x axis; and enabling, for a lifting stroke, the start position to appear an ellipse shape with a central point at the position of the first track point, a long axis having a length of 2*w, a short axis having a length of w, and the long axis rotated clockwise by 25° to 35° from being parallel to the x axis.

In an embodiment, the method further includes:

determining, according to the related parameter of each track point contained in the stroke, a shape of the end position of the stroke.

In an embodiment, the determining, according to the related parameter of each track point contained in the stroke, the shape of the end position of the stroke includes:

assuming that the stroke contains N track points, calculating, according to the related parameters of the $(N-2)^{th}$ track point, the $(N-1)^{th}$ track point and the $N^{th}$ track point contained in the stroke, a writing speed variation corresponding to the end position of the stroke, and determining, according to the writing speed variation, a line width of the writing track of the shape of the end position of the stroke, where N is an integer greater than or equal to 3.

In an embodiment, the calculating, according to the related parameters of the $(N-2)^{th}$ track point, the $(N-1)^{th}$ track point and the $N^{th}$ track point contained in the stroke, the writing speed variation corresponding to the end position of the stroke, and the determining, according to the writing speed variation, the line width of the writing track of the shape of the end position of the stroke include:

calculating, according to the related parameters of the $(N-2)^{th}$ track point and the $(N-1)^{th}$ track point, a writing speed $v_{N-1}$ of a writing track between the $(N-2)^{th}$ track point and the $(N-1)^{th}$ track point, calculating, according to the related parameters of the $(N-1)^{th}$ track point and the $N^{th}$ track point, a writing speed $v_N$ of a writing track between the $(N-1)^{th}$ track point and the $N^{th}$ track point, and calculating the writing speed variation corresponding to the end position of the stroke $\Delta v = v_N - v_{N-1}$; and determining, according to the writing speed variation $\Delta v$, the line width of the writing track of the shape of the end position of the stroke.

In an embodiment, the determining, according to the writing speed variation $\Delta v$, the line width of the writing track of the shape of the end position of the stroke includes:

if $\Delta v > \Delta v_{MAX}$, providing an auxiliary point to which the stroke extends on an extension line of a connection line between the $(N-1)^{th}$ track point and the $N^{th}$ track point, where a line width of the writing track between the $N^{th}$ track point and the auxiliary point is gradually reduced; and if $\Delta v < \Delta v_{MIN}$, setting the line width of the writing track between the $(N-1)^{th}$ track point and the $N^{th}$ track point to be gradually increased;

where $\Delta v_{MIN}$ and $\Delta v_{MAX}$ respectively represent a preset minimum writing speed variation threshold and a preset maximum writing speed variation threshold.

In an embodiment, if $\Delta v_{MIN} \leq \Delta v \leq \Delta v_{MAX}$, the line width of the writing track between the $(N-1)^{th}$ track point and the $N^{th}$ track point remains unchanged, where $\Delta v_{MIN}$ and $\Delta v_{MAX}$ respectively represent a preset minimum writing speed variation threshold and a preset maximum writing speed variation threshold.

In an embodiment, a distance between the auxiliary point and the $N^{th}$ track point is set to be greater than a distance between the $(N-1)^{th}$ track point and the $N^{th}$ track point.

In an embodiment, $v_N$ is calculated according to a formula of $v_N = d_N/(t_N - t_{N-1})$, where $t_{N-1}$ is the time parameter of the $(N-1)^{th}$ track point, $t_N$ is the time parameter of the $N^{th}$ track point, and $d_N = (|x_N - x_{N-1}|^2 + |y_N - y_{N-1}|^2)^{1/2}$; and $v_{N-1}$ is calculated according to a formula of $v_{N-1} = d_{N-1}/(t_{N-1} - t_{N-2})$, where $t_{N-2}$ is the time parameter of the $(N-2)^{th}$ track point, $t_{N-1}$ is the time parameter of the $(N-1)^{th}$ track point, and $d_{N-1} = (|x_{N-1} - x_{N-2}|^2 + |y_{N-1} - y_{N-2}|^2)^{1/2}$.

In an embodiment, the determining, according to the related parameter of each track point, the start position, the end position, and the type of the stroke contained in the writing track includes:

in a case where the stroke contains N track points, taking a position of the first track point of the N track points as the start position of the stroke, and taking a position of the $N^{th}$ track point of the N track points as the end position of the stroke, where N is an integer greater than or equal to 2;

determining the type of the stroke according to an abscissa difference $\Delta x = x_N - x_1$ and an ordinate difference $\Delta y = y_N - y_1$ between the $N^{th}$ track point and the first track point.

In an embodiment, the method further includes: establishing a two-dimensional rectangular coordinate system in which a positive direction of the X axis is rightward and a positive direction of the Y axis is downward;

where the determining the type of the stroke according to the abscissa difference $\Delta x = x_N - x_1$ and the ordinate difference $\Delta y = y_N$ between the $N^{th}$ track point and the first track point includes:

determining the type of stroke as the horizontal stroke if $\Delta x \neq 0$ and $\Delta y = 0$, or $\Delta x > 0$ and $0 < |\Delta y/\Delta x| \leq \alpha_1$;

determining the type of stroke as the vertical stroke if $\Delta x = 0$ and $\Delta y \neq 0$, or $\Delta y > 0$ and $0 < |\Delta x/\Delta y| \leq \alpha_1$;

determining the type of stroke as the left-falling stroke if $\Delta x < 0$, $\Delta y > 0$ and $\alpha_1 < |\Delta y/\Delta x| \leq \alpha_2$;

determining the type of stroke as the right-falling stroke if $\Delta x > 0$, $\Delta y > 0$ and $\alpha_1 < |\Delta y/\Delta x| \leq \alpha_2$; and determining the type of stroke as the lifting stroke if $\Delta x > 0$, $\Delta y < 0$ and $\alpha_1 < |\Delta y/\Delta x| \leq \alpha_2$;

where $\alpha_1$ and $\alpha_2$ respectively represent a first stroke threshold and a second stroke threshold.

In an embodiment, the first stroke threshold $\alpha_1$ is in a range between 0.2 and 0.3, and the second stroke threshold $\alpha_2$ is in a range between 3 and 3.9.

In an embodiment, the method further includes: smoothing the writing track after the shape of the start position of the stroke is determined based on an anti-aliasing method.

In an embodiment, the method further includes: smoothing the writing track after the shape of the start position and the shape of the end position of the stroke are determined based on an anti-aliasing method.

In an embodiment, the determining, according to the sample point in the writing track that is input by the user by means of the touch display, a group of track points includes:

sampling a touch on a working surface of the touch display to obtain a plurality of sample points; and interpolating based on the plurality of sample points by a Bezier curve fitting algorithm to obtain a plurality of interpolation points, where the group of track points includes the plurality of sample points and the plurality of interpolation points.

In an embodiment, the coordinate parameter of each of the plurality of sample points is a coordinate point of the sample point in a coordinate system on the working surface of the touch display, and the time parameter of the sample point is an absolute value of the time at which the track point at the sample point occurs; and the coordinate parameter of each of the plurality of interpolation points is determined based on coordinate values of two nearest sample points at both sides of the interpolation point and a position of the interpolation point relative to the two nearest interpolation points, and the time parameter of the interpolation point is determined based on the time parameters of the two nearest sample points at both sides of the interpolation point and the position of the interpolation point relative to the two nearest interpolation points.

A second aspect of the present disclosure provides a touch display device, including:

an acquisition unit configured to determine, according to a sample point in a writing track that is input by a user by means of a touch display, a group of track points and a related parameter of each track point, the related parameter including a coordinate parameter and a time parameter;

a determinator configured to determine, according to the related parameter of each track point, a start position, an end position, and a type of a stroke contained in the writing track, where the type of the stroke includes one of a horizontal stroke, a vertical stroke, a left-falling stroke, a right-falling stroke or a lifting stroke; and a setter configured to determine, according to the type of the stroke, a shape of the start position of the stroke.

A third aspect of the present disclosure provides a computer device, including a memory, a processor and a computer program stored in the memory and executable on the processor, where the processor, when executing the computer program, implements the method according to any one of the embodiments in the first aspect of the present disclosure.

A fourth aspect of the present disclosure provides non-transitory computer-readable storage medium having stored thereon a computer program, where the computer program, when executed by a processor, causes the method according to any one of the embodiments in the first aspect of the present disclosure to be implemented.

BRIEF DESCRIPTION OF DRAWINGS

Exemplary implementations of the present disclosure will be described in further detail below with reference to the accompanying drawings.

DETAIL DESCRIPTION OF EMBODIMENTS

Figure 1:
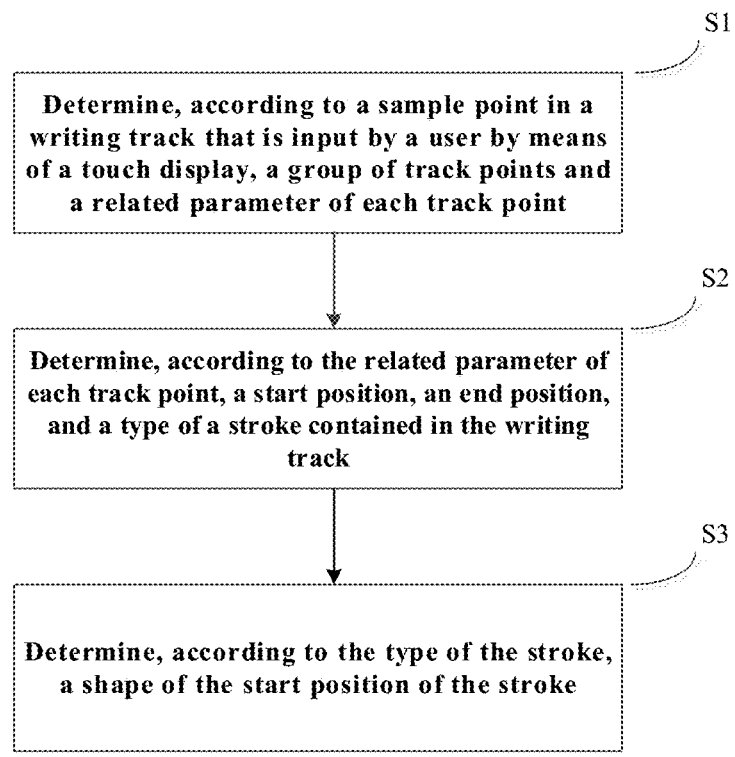
FIG. 1 is a flowchart of a handwriting processing method according to an embodiment of the present disclosure.

To more clearly illustrate the present disclosure, the present disclosure is further described below in conjunction with the exemplary embodiments and the drawings. Like parts are designated with the same reference signs throughout the drawings. It is to be understood by one of ordinary skill in the art that the following detailed description is illustrative and not restrictive, and is not to be taken as limiting the scope of the present disclosure.

The inventors of the present inventive concept have found that the electronic interactive whiteboard, as a convenient tool in the fields of education, office, medical treatment and the like, plays an extremely important role in information interaction and sharing. However, the user experience of the product is restricted by the processing speed, the handwriting processing effect and the like of the electronic interactive whiteboard. Current methods for realizing a stroke end effect of non-pressure-sensitive handwriting input are generally complicated, and involve a great deal of time and calculations to output a stroke with a stroke end effect, which poses high requirements on hardware computing resources, results in poor real-time performance, and makes it hard for a user to obtain smooth handwriting input experience.

Moreover, with the technological progress of smart devices such as tablets and smartphones in recent years, users have increasing requirements on the handwriting function. However, the handwriting effect on a smart device is not good because the writing experience on the screen of the smart device is different from that on actual paper, and the user himself/herself is not familiar with calligraphy.

To this end, some embodiments of the present disclosure provide a handwriting automatic processing technology, including a handwriting processing method, a touch display device, a computer device, and a computer-readable storage medium, which can eliminate jagged or step-like appearance of the handwriting, while still having a stroke end effect, thereby providing a smoother, more rounded, more flowing and more natural writing experience for a user.

An embodiment of the present disclosure provides a handwriting processing method, including the steps of:

determining, according to a sample point in a writing track that is input by a user by means of a touch display, a group of track points and a related parameter of each track point, the related parameter including a coordinate parameter and a time parameter;

determining, according to the related parameter of each track point, a start position, an end position, and a type of a stroke contained in the writing track, where the type of the stroke includes one of a horizontal stroke, a vertical stroke, a left-falling stroke, a right-falling stroke or a lifting stroke;

determining, according to the type of the stroke, a shape of the start position of the stroke to present the handwriting with a stroke end effect at the start position.

By setting the shape of the start position of the stroke contained in the writing track, the handwriting processing method provided by the present embodiment can achieve the real-time handwriting processing effect without a pressure sense, while giving the presented handwriting a stroke end effect, thereby improving the writing experience of the user. Moreover, the method also has the advantages of a smaller calculation amount, higher calculation speed, simpler principle of realization, improved real-time performance, and the like. The method can be widely applied to electronic interactive whiteboards (such as meeting whiteboards, teaching whiteboards or the like), electronic board newspapers, airport digital signature walls, cloud books, handwriting boards or other scenarios involving handwriting input.

FIG. 1 is a schematic flowchart of a handwriting processing method provided in the present embodiment. For example, the handwriting processing method may be applied to a computing device, which may be any electronic device having a computing function, for example, a mobile phone, a laptop, a tablet, a desktop computer, a server, or the like, which is not limited in the embodiment of the present disclosure. For example, the computing device has a central processing unit (CPU) or a graphics processing unit (GPU), and further has a memory. The memory is, for example, a nonvolatile (or non-transitory) memory (e.g., a read only memory (ROM)) having codes of an operating system stored thereon. For example, the memory further stores computer codes or computer instructions, which may be executed to implement the handwriting processing method provided by the embodiment.

For example, the computing device may further include a touch display, such as a touch screen or a touch display formed by a touch panel matched with a display, to obtain an initial handwriting of a user formed on a working surface of the touch display during writing. The touch screen can not only receive the initial handwriting, but also perform corresponding display at the same time. The user may write directly on the working surface of the touch screen with a finger, or may write on the working surface of the touch screen with an active or passive stylus, which is not limited in this embodiment. Here, the working surface refers to a surface for detecting a touch operation by a user, such as a touch surface of a touch screen. It should be noted that, in this embodiment, the type of the touch display is not limited, it may be a touch screen, or may also be any device with a touch function, such as an interactive whiteboard, or may be selected based on the actual requirements.

For example, as shown in FIG. 1, the handwriting processing method provided in this embodiment includes the following steps S1 to S3.

Step S1 is a step of acquiring a group of track points, including: determining, according to a sample point in a writing track that is input by a user by means of a touch display, a group of track points and a related parameter of each track point, the related parameter including a coordinate parameter and a time parameter.

The group of track points obtained in step S1 may correspond to a single stroke, or may correspond to a plurality of strokes due to the relatively low real-time performance of acquiring the group of track points or the like. In the case of a plurality of strokes, since one stroke corresponds to a relatively continuous writing track, each stroke corresponding to the group of track points can be obtained by dividing based on a coordinate interval and/or time interval between adjacent tracks in the writing track.

In a specific example, the determining, according to the sample point in the writing track that is input by the user by means of the touch display, a group of track points includes: sampling a touch on a working surface of the touch display to obtain a plurality of sample points; and interpolating based on the plurality of sample points by a Bezier curve fitting algorithm to obtain a plurality of interpolation points. The track points in the group of track points include the plurality of sample points and the plurality of interpolation points. The coordinate parameter of a sample point is coordinate points of the sample point in a coordinate system on the working surface of the touch display, and the time parameter of the sample point is an absolute or relative time value of the track point at which the writing occurs, or a difference in time values of the track point and a previous sample point at which the writing occurs. The coordinate parameter of an interpolation point may be determined based on coordinate values of two nearest sample points of the interpolation point, and a position of the interpolation point relative to the two nearest sample points. The time parameter of the interpolation point is located between the time parameter values of the two nearest sample points.

The coordinate parameter and the time parameter of each sample point may be acquired and/or calculated.

For example, step S1 may include the following steps S11 and S12.

Step S11 includes sampling a writing track on a working surface of the touch display to obtain a plurality of sample points.

Step S12 includes interpolating based on the plurality of sample points by a Bezier curve fitting algorithm to obtain a plurality of interpolation points.

For example, in some embodiments, the touch display itself may perform the above steps S11 to S12 based on hardware (e.g., a touch control circuit, a sampling circuit, etc.) and software (e.g., a related program algorithm), or the like, which is included in the present embodiment, but the present embodiment is not limited thereto.

It should be noted that by incorporating in the group of track points the interpolation points obtained by interpolating with a Bezier curve fitting algorithm, enables the subsequent handwriting track for display to be smoother and more attractive. However, in this embodiment, the Bezier curve fitting algorithm is not limited to the case of fitting a second order Bezier curve. For example, in some embodiments, each track section of the writing track may correspond to 4 sample points, and in this case, the interpolation points may be obtained by fitting a third order Bezier curve.

Apparently, in some embodiments, the group of track points may include only a plurality of sample points, but no interpolation point, which is not limited in this embodiment.

It should be noted that, in this embodiment, the manner for acquiring the group of track points is not limited as long as data of the group of track points can be obtained. For example, in some embodiments, the handwriting processing method provided by the embodiment may be executed by a handwriting processing apparatus, and the data of the group of track points may be received by the handwriting processing apparatus from the outside.

Step S2 is a step of determining a start position, an end position and a type of a stroke, including: determining, according to the related parameter of each track point, a start position, an end position, and a type of a stroke contained in the writing track, where the type of the stroke includes one of a horizontal stroke, a vertical stroke, a left-falling stroke, a right-falling stroke or a lifting stroke.

In some optional implementations of this embodiment, in step S2, the determining, according to the related parameter of each track point, the start position, the end position, and the type of the stroke contained in the writing track (i.e., the step of determining a start position, an end position and a type of a stroke) includes:

in a case where the stroke contains N track points, taking a position of the first track point of the N track points as the start position of the stroke, and taking a position of the $N^{th}$ track point of the N track points as the end position of the stroke (in other words, assuming that the stroke contains N track points, taking the position of the first track point as the start position of the stroke, and taking the position of the $N^{th}$ track point as the end position of the stroke), where for example, in this embodiment, N may be an integer greater than or equal to 2; and determining the type of the stroke according to an abscissa difference $\Delta x = x_N - x_1$ and an ordinate difference $\Delta y = y_N - y_1$ between the $N^{th}$ track point and the first track point.

Such implementation can accurately and efficiently determine the type of the stroke contained in the writing track.

In some embodiments, to acquire the group of track points and the start position and the end position of the stroke, the touch display may sample the writing track written by a user on the working surface thereof according to a predetermined time sequence, to obtain coordinates of a plurality of sample points arranged in sequence (arranged according to the sequence of sampling). For example, the stroke may be sampled in a sparse sampling mode to obtain a plurality of sample points, and the number of the plurality of sample points may be determined according to actual situations. For example, as shown in FIG. 2, by sampling the writing track 110 on the working surface of the touch device in real time (for example, sampling at equal time intervals), the coordinates of the sequentially arranged 9 sample points C1 to C9 (as shown by the hollow black circles in FIG. 2) can be obtained.

For example, in some embodiments, the touch display may also determine an action type of each sample point according to event-driven rules. For example, as shown in FIG. 2, upon a pen-down action (i.e., a pen-down event), an action type of the sample point C1 corresponding to the pen-down action may be determined to be start-writing, i.e., the position of the sample point C1 is the start position; upon a pen-up action (i.e., a pen-up event), an action type of the sample point C9 corresponding to the pen-up action may be determined to be end-writing, i.e., the position of the sample point C9 is the end position; and the sample points C2 to C8 between the sample point C1 and the sample point C9 correspond to pen-moving actions, so the action types of the sample points C2 to C8 may be determined to be pen-moving, i.e., the positions of the sample points C2 to C8 are pen-moving positions. For example, when the handwriting processing method of the present embodiment is implemented in an Android operating system, for an input event (MotionEvent) of the touch display, ACTION_DOWN represents a pen-down event; ACTION_MOVE represents a pen-moving event; and ACTION_UP represents a pen-up event.

Figure 2:
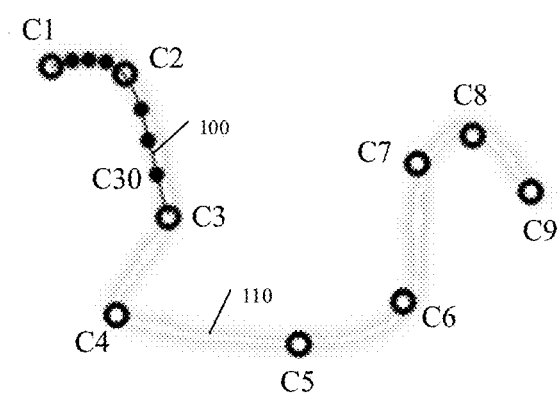
FIG. 2 is a schematic diagram of a group of track points according to an embodiment of the present disclosure.

For example, in some embodiments, as shown in FIG. 2, the 9 sample points C1 to C9 may divide the writing track 110 into four track sections, which are a first track section corresponding to the sample points C1 to C3, a second track section corresponding to the sample points C3 to C5, a third track section corresponding to the sample points C5 to C7, and a fourth track section corresponding to the sample points C7 to C9. The first, second, third and fourth track sections are sequentially arranged along an extending direction of the writing track 110 (i.e., the direction from the sample point C1 to the sample point C9), the first track section and the second track section are adjacent to each other and correspond to the same sample point C3, the second track section and the third track section are adjacent to each other and correspond to the same sample point C5, and the third track section and the fourth track section are adjacent to each other and correspond to the same sample point C7.

For example, based on the 3 sample points corresponding to each track section, interpolation may be performed by a Bezier curve fitting algorithm to obtain 6 interpolation points and thus a group of track points corresponding to the track section. The group of track points includes 9 track points (i.e., 3 sample points and 6 interpolation points). For example, in the group of track points, the 9 track points are sequentially arranged along an extending direction of the stroke. Taking the 3 sample points C1 to C3 corresponding to the first track section as an example, the interpolating by a Bezier curve fitting algorithm to obtain 6 interpolation points means fitting a second order Bezier curve (as shown by the black solid line in FIG. 2) based on the 3 sample points C1 to C3, taking 3 interpolation points from a curve segment between the sample point C1 and the sample point C2, and taking 3 interpolation points from a curve segment between the sample point C2 and the sample point C3, to obtain coordinates of the 6 interpolation points (as shown by the solid black dot C30 in FIG. 2), thereby obtaining a group of track points corresponding to the sample points C1 to C3 (i.e., a group of track points corresponding to the first track section). By analogy, a group of track points corresponding to the second track section, a group of track points corresponding to the third track section, and a group of track points corresponding to the fourth track section can be obtained, respectively. For example, in each group of track points, the action type of a track point which is essentially an interpolation point may be determined to be pen-moving.

For example, in the embodiment shown in FIG. 2, the writing track 110 corresponds to multiple (four) groups of track points, of which the action type of the first track point in the first group of track points is start-writing, the action type of the last track point in the last group of track points is end-writing, and the action types of the remaining track points are pen-moving. For example, in some examples, the data of each track point may include a type identifier for marking the action type of the track point. For example, when the type identifier is 1, the action type of the track point is start-writing; when the type identifier is 2, the action type of the track point is pen-moving; and when the type identifier is 3, the action type of the track point is end-writing. For example, in other examples, in order to save the storage space and reduce the data transmission amount, in the case that the writing track 110 corresponds to multiple groups of track points, each group of track points may correspond to one type identifier. For example, when the group of track points corresponds to a type identifier 1, the action type of the first track point in that group of track points is start-writing, the action types of the remaining track points in that group of track points are default to be pen-moving; when the group of track points corresponds to a type identifier 2, the action type of each track point in that group of track points is default to be pen-moving; and when the group of track points corresponds to a type identifier 3, the action type of the last track point in that group of track points is end-writing, and the action types of the remaining track points in that group of track points are default to be pen-moving. For another example, when the group of track points corresponds to a type identifier 1, the action type of each track point in that group of track points is start-writing; when the group of track points corresponds to a type identifier 2, the action type of each track point in that group of track points is pen-moving; and when the group of track points corresponds to a type identifier 3, the action type of each track point in that group of track points is end-writing.

Figure 3:
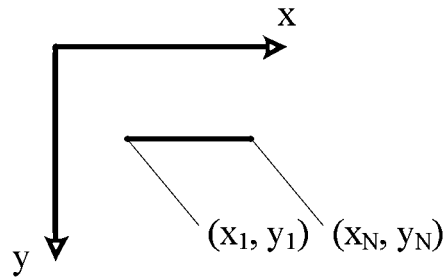
FIG. 3 is a schematic diagram showing the relationship between the abscissa and the ordinate of the $N^{th}$ track point and the abscissa and the ordinate of the first track point of the horizontal stroke according to an embodiment of the present disclosure.
Figure 4:
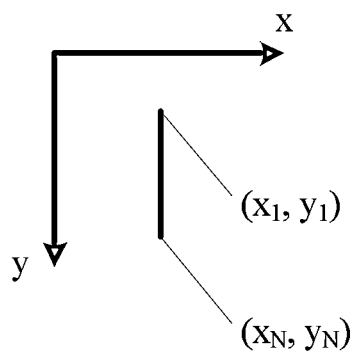
FIG. 4 is a schematic diagram showing the relationship between the abscissa and the ordinate of the $N^{th}$ track point and the abscissa and the ordinate of the first track point of the vertical stroke according to an embodiment of the present disclosure.
Figure 5:
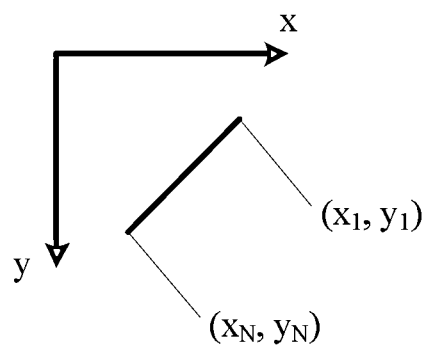
FIG. 5 is a schematic diagram showing the relationship between the abscissa and the ordinate of the $N^{th}$ track point and the abscissa and the ordinate of the first track point of the left-falling stroke according to an embodiment of the present disclosure.
Figure 6:
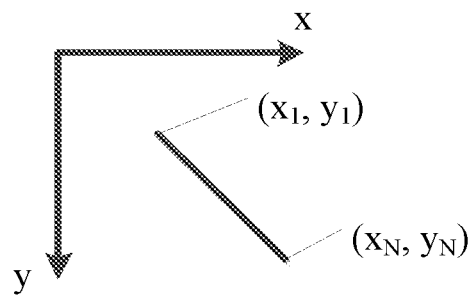
FIG. 6 is a schematic diagram showing the relationship between the abscissa and the ordinate of the $N^{th}$ track point and the abscissa and the ordinate of the first track point of the right-falling stroke according to an embodiment of the present disclosure.
Figure 7:
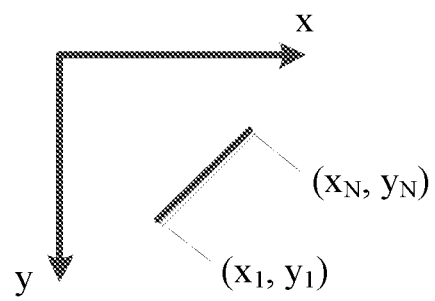
FIG. 7 is a schematic diagram showing the relationship between the abscissa and the ordinate of the $N^{th}$ track point and the abscissa and the ordinate of the first track point of the lifting stroke (which may also be referred to as the right-rising stroke) according to an embodiment of the present disclosure.

In some optional implementations of this embodiment, the step of determining the type of the stroke according to the abscissa difference $\Delta x = x_N - x_1$ and the ordinate difference $\Delta y = y_N - y_1$ between the $N^{th}$ track point and the first track point may include:

assuming that a positive direction of the x-axis in the coordinate system is rightward and a positive direction of the y-axis is downward, for example, as shown in FIGS. 3 to 7, then:

determining the type of stroke as horizontal (i.e., a horizontal stroke) if $\Delta x \neq 0$ and $\Delta y = 0$, or $\Delta x > 0$ and $0 < |\Delta y/\Delta x| \leq \alpha_1$, where the relationship between the abscissa and the ordinate of the $N^{th}$ track point and the abscissa and the ordinate of the first track point of the horizontal stroke is as shown in FIG. 3, and it will be appreciated that $|\Delta y/\Delta x|$ represents an absolute value of $y/\Delta x$;

determining the type of stroke as vertical (i.e., a vertical stroke) if $\Delta x=0$ and $\Delta y \neq 0$, or $\Delta y>0$ and $0<|\Delta x/\Delta y| \leq \alpha_1$, where the relationship between the abscissa and the ordinate of the $N^{th}$ track point and the abscissa and the ordinate of the first track point of the vertical stroke is as shown in FIG. 4;

determining the type of stroke as left-falling (i.e., a left-falling stroke) if $\Delta x<0$, $\Delta y>0$ and $\alpha_1<|\Delta y/\Delta x| \leq \alpha_2$, where the relationship between the abscissa and the ordinate of the $N^{th}$ track point and the abscissa and the ordinate of the first track point of the left-falling stroke is as shown in FIG. 5;

determining the type of stroke as right-falling (i.e., a right-falling stroke) if $\Delta x>0$, $\Delta y>0$ and $\alpha_1<|\Delta y/\Delta x| \leq \alpha_2$, where the relationship between the abscissa and the ordinate of the $N^{th}$ track point and the abscissa and the ordinate of the first track point of the right-falling stroke is as shown in FIG. 6; and determining the type of stroke as lifting (i.e., a lifting stroke) if $\Delta x>0$, $\Delta y<0$ and $\alpha_1<|\Delta y/\Delta x| \leq \alpha_2$, where the relationship between the abscissa and the ordinate of the $N^{th}$ track point and the abscissa and the ordinate of the first track point of the lifting stroke is as shown in FIG. 7;

where $\alpha_1$ and $\alpha_2$ respectively represent a first stroke threshold and a second stroke threshold.

By determining the type of the stroke through a manner based on two stroke thresholds (specifically, ratio thresholds), this implementation can accurately and efficiently determine the type of the stroke contained in the writing track.

In some optional implementations of this embodiment, the first stroke threshold al is in a range between 0.2 and 0.3, and the second stroke threshold $\alpha_2$ is in a range between 3 and 3.9.

With such value ranges of the first stroke threshold value $\alpha_1$ and the second stroke threshold value $\alpha_2$ defined, this implementation can improve the accuracy and effectiveness in determination of the type of the stroke, and avoid misjudgment or invalid judgment caused by slight direction deviations during writing by a user.

Step S3 is a step of setting a presented shape, including: determining, according to the type of the stroke, a shape of the start position of the stroke to present the handwriting with a stroke end effect at the start position.

In some optional implementations of this embodiment, by determining, according to the type of the stroke, the presented shape of the start position of the stroke, step S3 presents the handwriting with a stroke end effect of the hard-pen calligraphy at the start position. It should be noted that the handwriting processing method provided in this embodiment may present the stroke end effects of various kinds of calligraphy, but relatively speaking, this embodiment is more suitable for presenting the stroke end effect of hard-pen calligraphy (for example, when a user selects the writing mode of pencil brush upon writing with a handwriting pen).

In some optional implementations of this embodiment, in step S3, the determining, according to the type of the stroke, the shape of the start position of the stroke includes: enabling the start position of the stroke to appear an ellipse shape corresponding to the type of the stroke.

By means of the ellipse shapes of the start positions of different types of strokes, this implementation has the advantages of a smaller calculation amount, higher processing speed, conformity with the characteristics of an end of a stroke of a Chinese character and the like, and can efficiently realize more attractive presentation of the stroke end effect at the start position of the stroke in the handwriting of the handwriting pen.

Figure 8:
FIG. 8 is a schematic diagram of an ellipse shape of the start position of the horizontal stroke according to an embodiment of the present disclosure.
Figure 9:
FIG. 9 is a schematic diagram of an ellipse shape of the start position of the vertical stroke according to an embodiment of the present disclosure.
Figure 10:
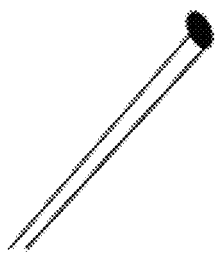
FIG. 10 is a schematic diagram of an ellipse shape of the start position of the left-falling stroke according to an embodiment of the present disclosure.
Figure 11:
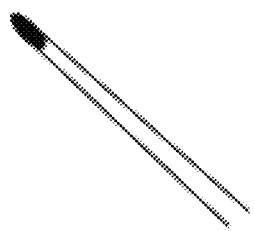
FIG. 11 is a schematic diagram of an ellipse shape of the start position of the right-falling stroke according to an embodiment of the present disclosure.
Figure 12:
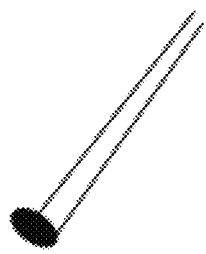
FIG. 12 is a schematic diagram of an ellipse shape of the start position of a lifting stroke according to an embodiment of the present disclosure.

In some optional implementations of this embodiment, the step of enabling the start position of the stroke to appear the ellipse shape corresponding to the type of the stroke may include:

assuming that the stroke contains N track points, taking a position of a first track point of the N track points as the start position of the stroke;

enabling, for a horizontal stroke, the start position to appear an ellipse shape with a central point at the position of the first track point, a long axis having a length of 1.5*w, a short axis having a length of w, and the long axis rotated clockwise by 25° to 35° from being parallel to an x axis, where w is a preset line width value of the writing track, and the ellipse shape of the start position of the horizontal stroke is as shown in FIG. 8;

enabling, for a vertical stroke, the start position to appear an ellipse shape with a central point at the position of the first track point, a long axis having a length of 2.5*w, a short axis having a length of w, and the long axis rotated clockwise by 45° to 55° from being parallel to the x axis, where the ellipse shape of the start position of the vertical stroke is as shown in FIG. 9;

enabling, for a left-falling stroke, the start position to appear an ellipse shape with a central point at the position of the first track point, a long axis having a length of 2*w, a short axis having a length of w, and the long axis rotated clockwise by 70° to 80° from being parallel to the x axis, where the ellipse shape of the start position of the left-falling stroke is as shown in FIG. 10;

enabling, for a right-falling stroke, the start position to appear an ellipse shape with a central point at the position of the first track point, a long axis having a length of 3.5*w, a short axis having a length of 0.8*w, and the long axis rotated clockwise by 40° to 50° from being parallel to the x axis, where the ellipse shape of the start position of the right-falling stroke is as shown in FIG. 11; and enabling, for a lifting stroke, the start position to appear an ellipse shape with a central point at the position of the first track point, a long axis having a length of 2*w, a short axis having a length of w, and the long axis rotated clockwise by 25° to 35° from being parallel to the x axis, where the ellipse shape of the start position of the lifting stroke is as shown in FIG. 12.

By providing the specific settings for the ellipse shapes of the start positions of different types of strokes, this implementation has the advantages of a smaller calculation amount, higher processing speed, conformity with the characteristics of an end of a stroke of a Chinese character and the like, and can efficiently realize more attractive presentation of the stroke end effect at the start position of the stroke in the handwriting of the handwriting pen.

In this embodiment, regarding the stroke "point" in the six basic strokes other than the horizontal, vertical, left-falling, right-falling and lifting strokes as described above, it can be determined that the stroke written by the user is "point" when $\Delta x=0$ and $\Delta y=0$ (that is, a track point is acquired at the same position at two or more consecutive sampling time points) or when an isolated track point occurs (for example, N may be an integer equal to 1 in this embodiment). Alternatively, since the user may also write a very short stroke like the right-falling stroke in writing track when writing the point stroke, it is also possible to preliminarily determine that the stroke is a point stroke or the right-falling stroke by the aforementioned determination condition "$\Delta x>0$, $\Delta y>0$ and $\alpha_1<|\Delta y/\Delta x|\leq\alpha_2$", then compare a length of the stroke (the length d of the stroke may be calculated from the coordinates, e.g., $d^2=|x_N-x_1|^2+|y_N-y_1|^2$) to lengths of other strokes or a preset length threshold, and finally determine whether the stroke is a right-falling or point stroke (e.g., N is an integer greater than or equal to 2 in this embodiment). A stroke "point" may be presented without any stroke end effect, or may be presented with a stroke end effect with a fixed preset shape (e.g., a shape like a slanting raindrop).

In some optional implementations of this embodiment, the handwriting processing method (for example, after step S3) may further include: determining, according to the related parameter of each track point contained in the stroke, a shape of the end position of the stroke.

By setting the shape of the end position of the stroke contained in the writing track, this implementation can enable the touch display to present handwriting with a more attractive stroke end effect.

In some optional implementations of this embodiment, the step of determining, according to the related parameter of each track point contained in the stroke, the shape of the end position of the stroke may include the following steps:

assuming that the stroke contains N track points, calculating, according to the related parameters of the $(N-2)^{th}$ track point, the $(N-1)^{th}$ track point and the $N^{th}$ track point contained in the stroke, a writing speed variation corresponding to the end position of the stroke, and determining, according to the writing speed variation, a line width of the writing track of the shape of the end position of the stroke. For example, in the present embodiment, N may be an integer greater than or equal to 3.

By setting the line width of the writing track of the shape of the end position according to a change in the writing speed at the end position of the stroke, this implementation can realize the stroke end effect of throwing pen, pausing pen, or the like at the end position, has the advantages of a smaller calculation amount, higher processing speed, conformity with the characteristics of an end of a stroke of a Chinese character and the like, and can efficiently realize more attractive presentation of the stroke end effect at the end position of the stroke in the writing of the handwriting pen.

In some optional implementations of this embodiment, the steps of calculating, according to the related parameters of the $(N-2)^{th}$ track point, the $(N-1)^{th}$ track point and the $N^{th}$ track point contained in the stroke, the writing speed variation corresponding to the end position of the stroke, and determining, according to the writing speed variation, the line width of the writing track of the shape of the end position of the stroke may include the following steps:

calculating, according to the related parameters of the $(N-2)^{th}$ track point and the $(N-1)^{th}$ track point, a writing speed $v_{N-1}$ of a writing track between the $(N-2)^{th}$ track point and the $(N-1)^{th}$ track point, calculating, according to the related parameters of the $(N-1)^{th}$ track point and the $N^{th}$ track point, a writing speed $v_N$ of a writing track between the $(N-1)^{th}$ track point and the $N^{th}$ track point, and calculating the writing speed variation corresponding to the end position of the stroke $\Delta v=v_N-v_{N-1}$; and determining, according to the writing speed variation $\Delta v$, the line width of the writing track of the shape of the end position of the stroke.

Figure 13:
FIG. 13 is a schematic diagram showing a stroke end effect of throwing pen at the end position of the right-falling stroke according to an embodiment of the present disclosure.
Figure 14:
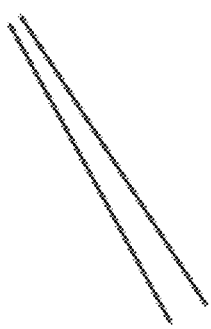
FIG. 14 is a schematic diagram showing a stroke end effect of pausing pen at the end position of the right-falling stroke according to an embodiment of the present disclosure.

Further, the step of determining, according to the writing speed variation $\Delta v$, line width of the writing track of the shape of the end position of the stroke may include the following steps:

if $\Delta v>\Delta v_{MAX}$, providing an auxiliary point to which the stroke extends on an extension line of a connection line between the $(N-1)^{th}$ track point and the $N^{th}$ track point, where a line width of the writing track between the $N^{th}$ track point and the auxiliary point is gradually reduced to realize the stroke end effect of throwing pen at the end position, such as the right-falling stroke with a stroke end effect of throwing pen at the end position shown in FIG. 13; and if $\Delta v<\Delta v_{MIN}$, setting the line width of the writing track between the $(N-1)^{th}$ track point and the $N^{th}$ track point to be gradually increased, to realize the stroke end effect of pausing pen at the end position, such as the right-falling stroke with a stroke end effect of pausing pen at the end position shown in FIG. 14.

$\Delta v_{MIN}$ and $\Delta v_{MAX}$ respectively represent a preset minimum writing speed variation threshold and a preset maximum writing speed variation threshold.

Figure 15:
FIG. 15 is a schematic diagram showing an end position where a line width of the writing track of the horizontal stroke remains unchanged according to an embodiment of the present disclosure.

In addition, in this implementation, if $\Delta v_{MIN}\leq\Delta v\leq\Delta v_{MAX}$, the line width of the writing track between the $(N-1)^{th}$ track point and the $N^{th}$ track point remains unchanged. That is, the preset line width of the writing track is maintained, such as the end position shown in FIG. 15 where the line width of the writing track of the horizontal stroke remains unchanged.

By providing the specific settings for the line width of the writing track of the shape of the end position according to changes in the writing speed at the end position of the stroke, this implementation can realize the stroke end effect of throwing pen, pausing pen, or the like at the end position, has the advantages of a smaller calculation amount, higher processing speed, conformity with the characteristics of an end of a stroke of a Chinese character and the like, and can efficiently realize more attractive presentation of the stroke end effect at the end position of the stroke in the writing of the handwriting pen.

In some optional implementations of this embodiment, the auxiliary point is provided at a position such that: a distance between the auxiliary point and the $N^{th}$ track point is greater than a distance between the $(N-1)^{th}$ track point and the $N^{th}$ track point. In this manner, it is ensured that the stroke end effect at the end position of the throwing pen is more attractive.

In a specific example, a writing speed $v_N$ of a writing track between the $(N-1)^{th}$ track point and the $N^{th}$ track point is calculated according to the coordinate parameter and the time parameter of the $(N-1)^{th}$ track point and the $N^{th}$ track point. For example: a distance $d_N$ between the $(N-1)^{th}$ track point and the $N^{th}$ track point is calculated according to the coordinates, e.g., $d_N^2=|x_N-x_{N-1}|^2+|y_N-y_{N-1}|^2$, thereby obtaining $d_N=(|x_N-x_{N-1}|^2+|y_N-y_{N-1}|^2)^{1/2}$, and further combining with the time parameter $t_{N-1}$ of the $(N-1)^{th}$ track point and the time parameter $t_N$ of the $N^{th}$ track point, a writing speed $v_N$ of a writing track between the $(N-1)^{th}$ track point and the $N^{th}$ track point is calculated by $v_N=d_N/(t_N-t_{N-1})$. Further, $v_{N-1}$ may be further calculated according to an equation similar to that for calculating $v_N$.

For example, since the pen-moving position (i.e., a position on the writing track between the start position and the end position of the stroke) has little influence on the stroke end effect, especially for the stroke end effect of hard pen calligraphy, the pen-moving position in this embodiment takes a conventional shape. For example, for a pen-moving position of the horizontal stroke, a straight line with a width equal to a preset line width of the writing track is presented. A value of the preset line width of the writing track may be set and changed by a user.

In addition to the above description, other strokes, such as the derivative strokes of the Song typeface, for example, a horizontal fold stroke, a horizontal left-falling stroke, a vertical lifting stroke, a vertical hook stroke, or the like, in addition to the aforementioned basic strokes (i.e., the horizontal stroke, the vertical stroke, the left-falling stroke, the right-falling stroke and the lifting stroke), can also be presented with a stroke end effect using the above method. Taking the vertical lifting stroke as an example: the vertical lifting stroke may be divided into two strokes according to the above method for determining the stroke types of the vertical stroke and the lifting stroke, and then the shapes of the start positions and the end positions of the two strokes may be set as described above, respectively, or after the division, it is determined that the two strokes are continuous according to the coordinate interval and/or time interval, so, for example, only the shape of the start position of the vertical stroke and the shape of the end position of the lifting stroke are set as described above. It will be appreciated that such division has substantially no influence on the presentation of the stroke end effect. Alternatively, based on the characteristic that one stroke usually corresponds to a relatively continuous writing track, the type of the stroke may be integrally determined to be a vertical lifting stroke according to the coordinate interval and/or time interval of adjacent track points in the writing track, and then, for example, the shape of the start position of the vertical stroke and the shape of the end position of the lifting stroke are set as described above, to present the stroke end effect of the vertical lifting stroke.

In some optional implementations of this embodiment, the handwriting processing method includes performing a smoothing process based on an anti-aliasing method on the writing track after determining the shape of the start position of the stroke in step S3, or on the writing track after determining the shape of the start position of the stroke in step S3 and determining the shape of the end position of the stroke in another step. That is, the handwriting processing method further includes performing a smoothing process based on an anti-aliasing method after presenting the handwriting with the stroke end effect.

With this implementation, the jagged lines of the handwriting with the stroke end effect can be removed, the presented handwriting is more attractive, and the writing experience of a user can be further improved.

Figure 16:
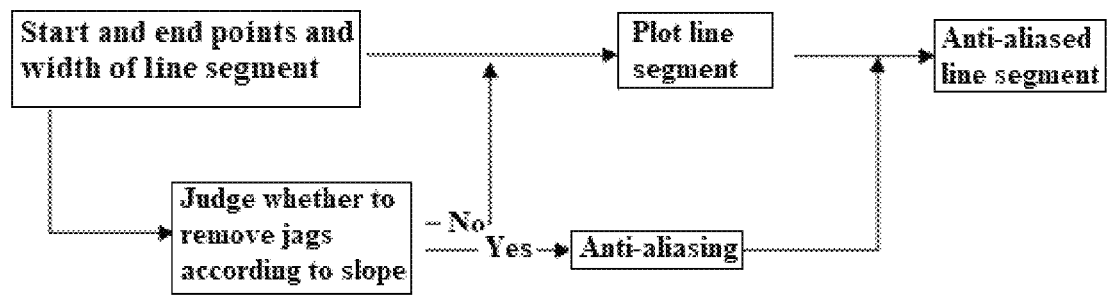
FIG. 16 is a flowchart of a smoothing process based on an anti-aliasing method according to an embodiment of the present disclosure.

In a specific example, as shown in FIG. 16, the smoothing process based on the anti-aliasing method includes:

for a vertical or horizontal line segment which basically has no jag (i.e., jagged portion), determining, according to a slope of a line segment (for example, a slope representing an inclination degree of the line segment to an x axis) formed by coordinate points corresponding to adjacent track points among N track points of the strokes contained in the writing track, whether the line segment needs to be smoothed based on an anti-aliasing method. It may be simply and directly determined that a line segment corresponding to a vertical or horizontal stroke, especially a line segment corresponding to the moving position or the end position of the vertical or horizontal stroke, does not need to be smoothed.

For a line segment which needs to be smoothed, the smoothing process based on the anti-aliasing method specifically includes:

firstly acquiring, for a line segment formed by coordinate points (xi, yi) and (xj, yj), a line width wij of the writing track of the line segment, and determining four coordinate points of a rectangle taking a straight line segment connecting the two coordinate points as a central axis and wij as the line width as well as determining a slope k of the straight line segment, where k is (yj−yi)/(xj−xi).

Figure 17:
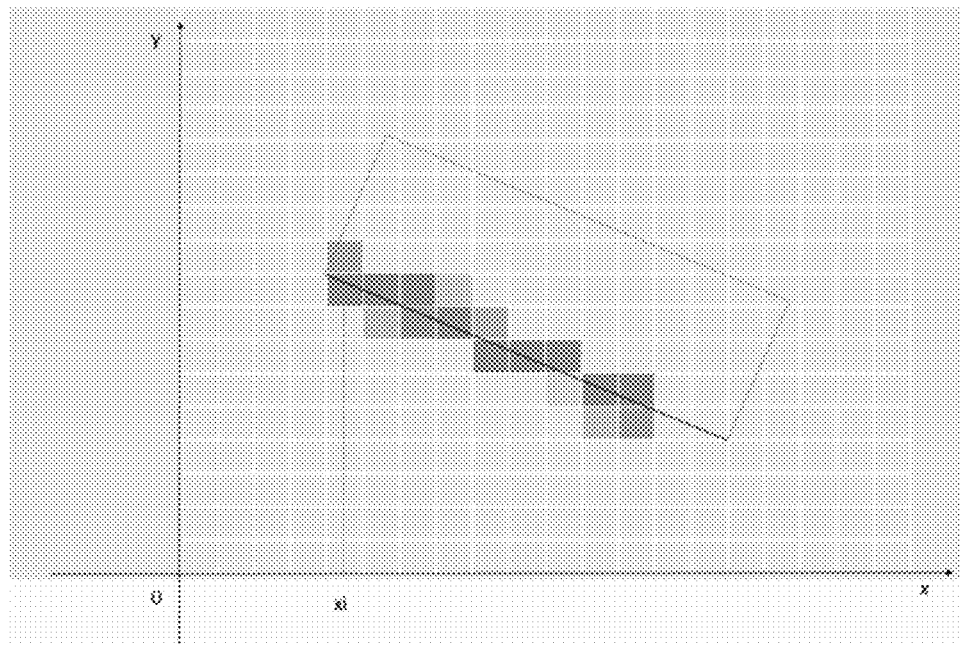
FIG. 17 is a schematic diagram of an anti-aliasing method according to an embodiment of the present disclosure.

Secondly, the smoothing process based on anti-aliasing performed on the line segment after the slope k is obtained includes:

supplementing a coordinate point, in which: taking k being a negative value as an example, as shown in FIG. 17, anti-aliasing is performed taking the dark black line segment therein as an example; where in FIG. 17, one square represents the size of one pixel, the coordinate value of the center of a square is a floating point type value, if a coordinate point M (xi, kx+b) is a point on a dark black line segment, where xi is an x-axis coordinate of the center point of the pixel block where xi is located, and b is an offset of the dark black line segment, then the coordinate point at the upper right corner is N(int(xi)+1, int(kx+b)+1); if the distance $d_{MN}$ between coordinate points M and N is equal to $\sqrt{2}/2$, $\sqrt{2}$ equals to $2^{(1/2)}$, then only the current pixel block needs to be plotted; if the distance $d_{MN}$ between coordinate points M and N is less than $\sqrt{2}/2$ the current pixel block and a pixel block where the coordinate point (xi, kx+b+1) is located need to be plotted; and if the distance $d_{MN}$ between coordinate points M and N is greater than $\sqrt{2}/2$, the current pixel block and a pixel block where the coordinate point (xi, kx+b−1) is located need to be plotted; and calculating transparency of the supplemented coordinate point, in which: when it is determined that a pixel block B other than the pixel block A where the current coordinate point is located needs to be plotted, transparency of the pixel block B needs to be determined to achieve a smoother and more attractive effect without jags. A color transparency of the supplemented coordinate point is reflected by the distance $d_{MN}$ between coordinate points M and N. Specifically, the color transparency T is calculated by the formula of: $T=1-(d_{MN}/(\sqrt{2}/2))$. A final color value may be obtained from a product of each channel of the color value and the transparency.

Figure 18:
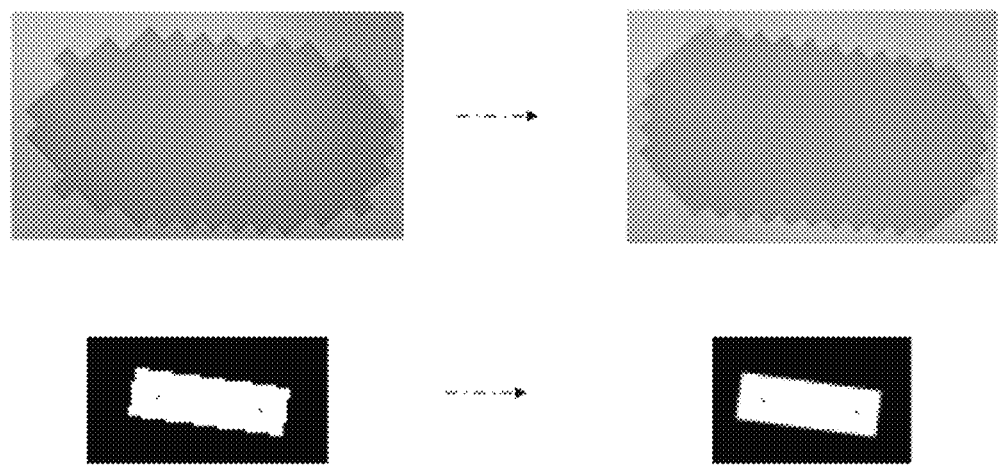
FIG. 18 is an effect diagram of the smoothing process based on an anti-aliasing method according to an embodiment of the present disclosure.

After the coordinate point to be supplemented with colors and the transparency thereof are obtained and plotted in the above manner, a line segment with jags or burrs can be changed into a line segment with uniform edges, as shown in FIG. 18. In FIG. 18, the left two pictures show a line segment before smoothing, and the right two pictures corresponding to the line segment after being smoothed based on the above-mentioned process. It can be seen that the line segment have no obvious jag after being smoothed based on the above-mentioned process, and thus the presented writing track is more attractive.

The above handwriting processing method may be applied to various scenarios. For example, in some embodiments, the above handwriting processing method can provide an interesting interaction mode for an airport display screen. The airport, as a landmark building of a city, is an important way to attract tourists. The handwriting processing method provided by the present embodiment may be integrated into a display screen of an airport. When arriving at the airport of a certain city, a tourist can write a signature on the display screen and display the signature on the display screen in a processed hard-pen calligraphy handwriting form. The tourist may take a photo with the signature, which forms a unique tourism mode of "signing in", thereby attracting more tourists and facilitating development of tourism of the city. In some other embodiments, the handwriting processing method as described above can provide a novel blackboard newspaper mode for a smart classroom, and can process a font of blackboard writing or blackboard newspaper of a student or teacher to present the content more clearly.

Figure 19:
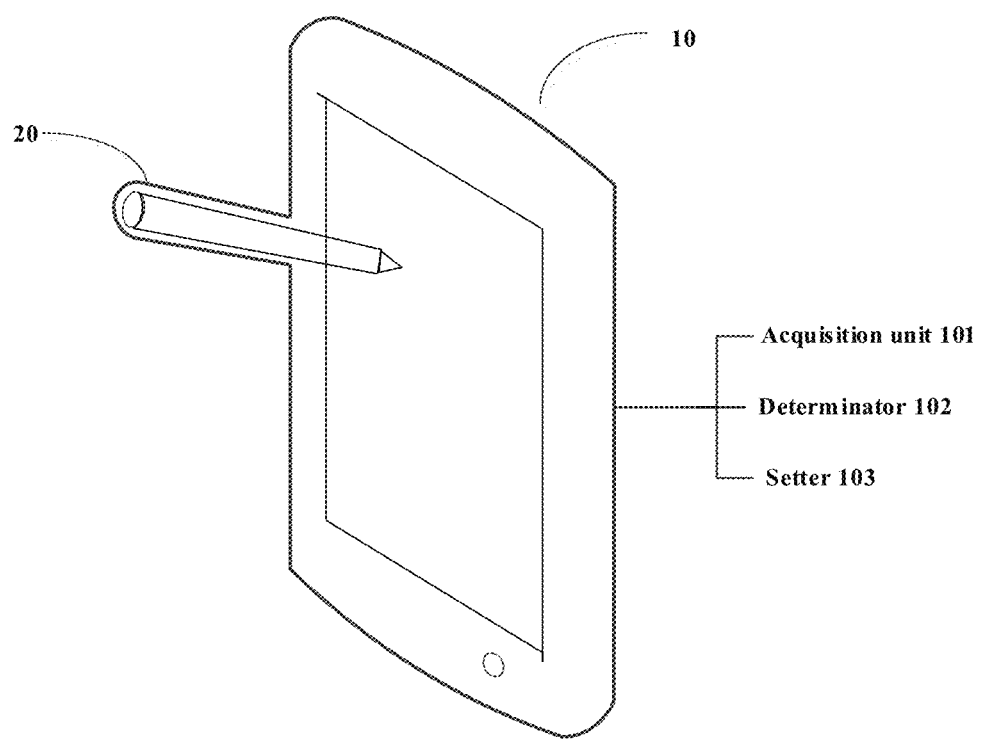
FIG. 19 is a schematic diagram of an electronic apparatus according to an embodiment of the present disclosure.

As shown in FIG. 19, taking a touch display device used in cooperation with a handwriting pen as an example, another embodiment of the present disclosure provides an electronic apparatus, including a touch display device 10 and a handwriting pen 20 used in cooperation with the touch display device 10. The touch display device 10 can implement the handwriting processing method provided in any one of the above embodiments.

The touch display device 10 may include an acquisition unit 101, a determinator (i.e., determining device) 102, and a setter (i.e., setting device) 103.

The acquisition unit 101 is configured to determine, according to a sample point in a writing track that is input by a user by means of a touch display, a group of track points and a related parameter of each track point, the related parameter including a coordinate parameter and a time parameter. Furthermore, the acquisition unit 101 may further perform sub-steps included in the step of determining, according to a sample point in a writing track that is input by a user by means of a touch display, a group of track points and a related parameter of each track point provided in any one of the above embodiments.

The determinator 102 is configured to determine, according to the related parameter of each track point, a start position, an end position, and a type of a stroke contained in the writing track. The type of the stroke includes one of a horizontal stroke, a vertical stroke, a left-falling stroke, a right-falling stroke or a lifting stroke. In addition, the determinator 102 may further perform sub-steps included in the step of determining, according to the related parameter of each track point, the start position, the end position, and the type of the stroke contained in the writing track provided in any one of the above embodiments.

The setter 103 is configured to determine, according to the type of the stroke, a shape of the start position of the stroke to present the handwriting with a stroke end effect at the start position via a touch screen of the touch display device.

In a specific example, the operating system of the touch display device 10 is an Android system, and the touch display device 10 may include a central processing unit (CPU) or an application processor (AP), which may execute the Android system to present handwriting with a stroke end effect through cooperation of an application layer and an underlayer of the Android system. Specifically, when a sample point of a writing track is acquired, the application layer transmits, via a data processing request, a coordinate parameter and a time parameter of the sample point to the underlayer (algorithm layer) to perform processing such as determination of start and end positions as well as a type of a stroke, setting of a shape for presenting the handwriting, smoothing based on an anti-aliasing method and the like, and then the underlayer returns the result (handwriting with a stroke end effect) to the application layer after the processing. In other words, the central processing unit or the application processor may, when executing the Android system, function as the acquisition unit 101, the determinator 102, and the setter 103, respectively.

It should be noted that the principle and the working flow of the touch display device in the electronic apparatus provided in this embodiment are similar to those of the handwriting processing method as described above, and reference may be made to the above description for relevant parts, which are not repeated here.

Figure 20:
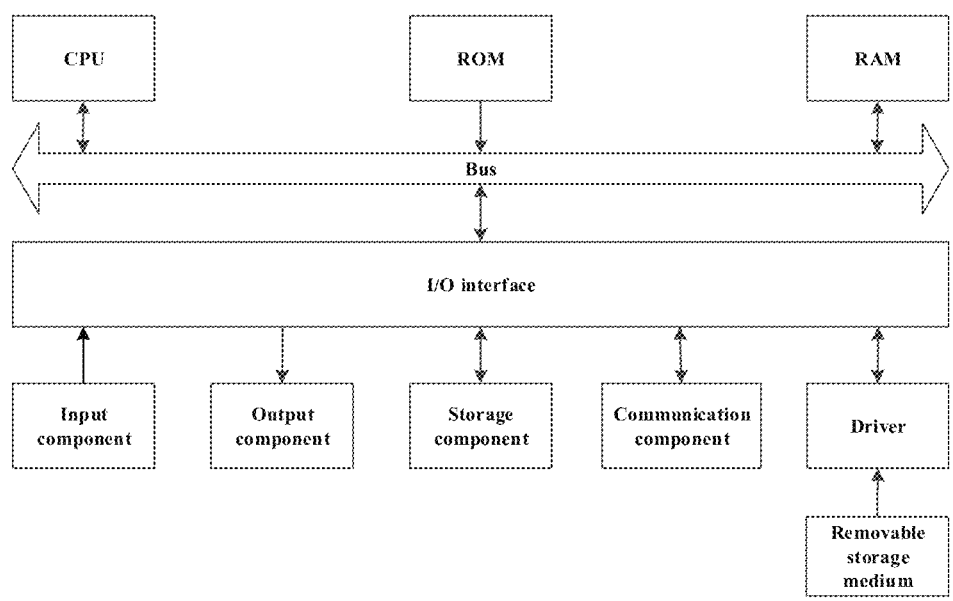
FIG. 20 is a schematic structural diagram of a computer system, according to an embodiment of the present disclosure, implementing a touch display device in the electronic apparatus provided by an embodiment of the present disclosure.

As shown in FIG. 20, alternatively, a computer system suitable for implementing the touch display device provided in the above embodiments may include a central processing unit (CPU) that can perform various appropriate actions and processes according to a program stored in a read only memory (ROM) or a program loaded from a storage component into a random access memory (RAM). Various programs and data necessary for the operation of the computer system are also stored in the RAM. The CPU, the ROM and the RAM are connected with each other via a bus. An input/output (I/O) interface is further connected to the bus.

The following components are connected to the I/O interface: an input component, including a keyboard, a mouse, or the like; an output component, including a liquid crystal display (LCD), a speaker, or the like; a storage component, including a hard disc, or the like; and a communication component, including a network interface card such as a LAN card, a modem, or the like. The communication component performs communication processing via a network such as the Internet. A driver is further connected to the I/O interface as needed. A removable (or detachable) storage medium, such as a magnetic disk, an optical disk, a magneto-optical disk, a semiconductor memory, or the like, is installed to the driver as needed so that the computer program read out therefrom is installed into the storage component as needed.

For example, according to this embodiment, the process described in the above flowchart may be implemented as a computer software program. For example, this embodiment includes a computer program product including a computer program stored on a non-transitory computer-readable medium. The computer program contains program codes to execute the method shown in the flowchart. In such embodiments, the computer program may be downloaded and installed from a network via the communication component, and/or installed from a removable storage medium.

The flowcharts and schematic diagrams in the drawings illustrate the architecture, functionality, and operation of possible implementations of the system, method and computer program product of the foregoing embodiments. In this regard, each block in the flowchart or schematic diagram may represent a functional block, a program segment, or a portion of code including one or more executable instructions for implementing the specified logical function(s). It should also be noted that, in some alternative implementations, the functions shown in the blocks may occur out of the order shown in the figures. For example, two blocks shown in succession may, in fact, be executed substantially concurrently, or may sometimes be executed in the reverse order, depending upon the functionality involved. It will also be noted that each block in the schematic diagram and/or flowchart, and combinations of blocks in the schematic diagram and/or flowchart, may be implemented by a special purpose hardware-based system which performs the specified functions or acts, or by combinations of special purpose hardware and computer instructions.

The modules described in the foregoing embodiments may be implemented by software or hardware. The described units may be provided in a processor, which may be described as: a processor, including an acquisition unit, a determinator, and a setter. For example, names of these units may not constitute limitations to the units themselves in some cases. For example, the setter may also be described as a "stroke end effect generation unit".

In another aspect, the present embodiment further provides a nonvolatile computer storage medium, which may be the nonvolatile computer storage medium included in the above apparatus of the above embodiment, or may be a nonvolatile computer storage medium that exists separately and is not installed into a terminal. The nonvolatile computer storage medium stores thereon one or more programs that, when executed by a device (e.g., a CPU or an AP), cause the device to at least perform the operations of: determining, according to a sample point in a writing track that is input by a user by means of a touch display, a group of track points and a related parameter of each track point, the related parameter including a coordinate parameter and a time parameter; determining, according to the related parameter of each track point, a start position, an end position, and a type of a stroke contained in the writing track, where the type of the stroke includes one of a horizontal stroke, a vertical stroke, a left-falling stroke, a right-falling stroke or a lifting stroke; and determining, according to the type of the stroke, a shape of the start position of the stroke.

It should be understood that the foregoing embodiments of the present disclosure may be combined with each other in case of no explicit conflict.

It should also be noted that, in the description of the present disclosure, relational terms such as first and second, are used merely for distinguishing one entity or operation from another without necessarily requiring or implying that there is any such actual relationship or order between such entities or operations. Moreover, the term "including," "comprising" or any variant thereof means to be non-exclusive so that a process, method, item or device including a series of elements includes not only said elements, but also other elements not explicitly listed, or inherent elements of such processes, methods, items or devices. In the absence of more limitations, an element defined by "including a . . . " does not exclude the existence of additional identical elements in the process, method, item or device including the element.

It should be understood that the above embodiments of the present disclosure are merely examples for clearly illustrating the present disclosure and are not intended to limit the implementations of the present disclosure. Other variations and modifications may be made by a person having ordinary skill in the art based on the above description. Exhaustive enumeration of all implementations are not provided here, but all obvious variations and modifications resulted from the technical solutions of the present disclosure are still within the scope of protection of the present disclosure as defined by the appended claims.

What is claimed is:

1. A handwriting processing method, comprising:
   determining, according to a sample point in a writing track that is input by a user by means of a touch display, a group of track points and a related parameter of each track point, the related parameter comprising a coordinate parameter and a time parameter;
   determining, according to the related parameter of each track point, a start position, an end position, and a type of a stroke contained in the writing track, wherein the type of the stroke comprises one of a horizontal stroke, a vertical stroke, a left-falling stroke, a right-falling stroke or a lifting stroke; and
   determining, according to the type of the stroke, a shape of the start position of the stroke.

2. The handwriting processing method according to claim 1, wherein the determining, according to the type of the stroke, the shape of the start position of the stroke comprises:
   enabling the start position of the stroke to appear an ellipse shape corresponding to the type of the stroke.

3. The handwriting processing method according to claim 2, wherein the enabling the start position of the stroke to appear the ellipse shape corresponding to the type of the stroke comprises:
   assuming that the stroke contains N track points, taking a position of a first track point of the N track points as the start position of the stroke, where N is an integer greater than or equal to 2;
   enabling, for the horizontal stroke, the start position to appear an ellipse shape with a central point at the position of the first track point, a long axis having a length of $1.5*w$, a short axis having a length of w, and the long axis rotated clockwise by 25° to 35° from being parallel to an x axis, where w is a preset line width value of the writing track;
   enabling, for the vertical stroke, the start position to appear an ellipse shape with a central point at the position of the first track point, a long axis having a length of $2.5*w$, a short axis having a length of w, and the long axis rotated clockwise by 45° to 55° from being parallel to the x axis;
   enabling, for the left-falling stroke, the start position to appear an ellipse shape with a central point at the position of the first track point, a long axis having a length of $2*w$, a short axis having a length of w, and the long axis rotated clockwise by 70° to 80° from being parallel to the x axis;
   enabling, for the right-falling stroke, the start position to appear an ellipse shape with a central point at the position of the first track point, a long axis having a length of $3.5*w$, a short axis having a length of $0.8*w$, and the long axis rotated clockwise by 40° to 50° from being parallel to the x axis; and
   enabling, for the lifting stroke, the start position to appear an ellipse shape with a central point at the position of the first track point, a long axis having a length of $2*w$, a short axis having a length of w, and the long axis rotated clockwise by 25° to 35° from being parallel to the x axis.

4. The handwriting processing method according to claim 1, further comprising:
   determining, according to the related parameter of each track point contained in the stroke, a shape of the end position of the stroke.

5. The handwriting processing method according to claim 4, wherein the determining, according to the related parameter of each track point contained in the stroke, the shape of the end position of the stroke comprises:
   assuming that the stroke contains N track points, calculating, according to the related parameters of the $(N-2)^{th}$ track point, the $(N-1)^{th}$ track point and the $N^{th}$ track point contained in the stroke, a writing speed variation corresponding to the end position of the stroke, and determining, according to the writing speed variation, a line width of the writing track of the shape of the end position of the stroke, where N is an integer greater than or equal to 3.

6. The handwriting processing method according to claim 5, wherein the calculating, according to the related parameters of the $(N-2)^{th}$ track point, the $(N-1)^{th}$ track point and the $N^{th}$ track point contained in the stroke, the writing speed variation corresponding to the end position of the stroke, and the determining, according to the writing speed variation, the line width of the writing track of the shape of the end position of the stroke comprise:

calculating, according to the related parameters of the $(N-2)^{th}$ track point and the $(N-1)^{th}$ track point, a writing speed $v_{N-1}$ of a writing track between the $(N-2)^{th}$ track point and the $(N-1)^{th}$ track point, calculating, according to the related parameters of the $(N-1)^{th}$ track point and the $N^{th}$ track point, a writing speed $v_N$ of a writing track between the $(N-1)^{th}$ track point and the $N^{th}$ track point, and calculating the writing speed variation corresponding to the end position of the stroke $\Delta v = v_N - v_{N-1}$; and determining, according to the writing speed variation $\Delta v$, the line width of the writing track of the shape of the end position of the stroke.

7. The handwriting processing method according to claim 6, wherein the determining, according to the writing speed variation $\Delta v$, the line width of the writing track of the shape of the end position of the stroke comprises:

if $\Delta v > \Delta v_{MAX}$, providing an auxiliary point to which the stroke extends on an extension line of a connection line between the $(N-1)^{th}$ track point and the $N^{th}$ track point, wherein a line width of the writing track between the $N^{th}$ track point and the auxiliary point is gradually reduced; and if $\Delta v < \Delta v_{MIN}$, setting the line width of the writing track between the $(N-1)^{th}$ track point and the $N^{th}$ track point to be gradually increased;

where $\Delta v_{MIN}$ and $\Delta v_{MAX}$ respectively represent a preset minimum writing speed variation threshold and a preset maximum writing speed variation threshold.

8. The handwriting processing method according to claim 7, wherein a distance between the auxiliary point and the $N^{th}$ track point is set to be greater than a distance between the $(N-1)^{th}$ track point and the $N^{th}$ track point.

9. The handwriting processing method according to claim 6, wherein if $\Delta v_{MIN} \leq \Delta v \leq \Delta v_{MAX}$, the line width of the writing track between the $(N-1)^{th}$ track point and the $N^{th}$ track point remains unchanged, where $\Delta v_{MIN}$ and $\Delta v_{MAX}$ respectively represent a preset minimum writing speed variation threshold and a preset maximum writing speed variation threshold.

10. The handwriting processing method according to claim 6, wherein $v_N$ is calculated according to a formula of $v_N = d_N/(t_N - t_{N-1})$, where $t_{N-1}$ is the time parameter of the $(N-1)^{th}$ track point, $t_N$ is the time parameter of the $N^{th}$ track point, and $d_N = (|x_N - x_{N-1}|^2 + |y_N - y_{N-1}|^2)^{1/2}$; and $v_{N-1}$ is calculated according to a formula of $v_{N-1} = d_{N-1}/(t_{N-1} - t_{N-2})$, where $t_{N-2}$ is the time parameter of the $(N-2)^{th}$ track point, $t_{N-1}$ is the time parameter of the $(N-1)^{th}$ track point, and $d_{N-1} = (|x_{N-1} - x_{N-2}|^2 + |y_{N-1} - y_{N-2}|^2)^{1/2}$.

11. The handwriting processing method according to claim 4, further comprising: smoothing the writing track after the shape of the start position and the shape of the end position of the stroke are determined based on an anti-aliasing method.

12. The handwriting processing method according to claim 1, wherein the determining, according to the related parameter of each track point, the start position, the end position, and the type of the stroke contained in the writing track comprises:

in a case where the stroke contains N track points, taking a position of a first track point of the N track points as the start position of the stroke, and taking a position of an $N^{th}$ track point of the N track points as the end position of the stroke, where N is an integer greater than or equal to 2; and determining the type of the stroke according to an abscissa difference $\Delta x = x_N - x_1$ and an ordinate difference $\Delta y = y_N - y_1$ between the $N^{th}$ track point and the first track point.

13. The handwriting processing method according to claim 12, further comprising establishing a two-dimensional rectangular coordinate system in which a positive direction of the X axis is rightward and a positive direction of the Y axis is downward;

wherein the determining the type of the stroke according to the abscissa difference $\Delta x = x_N - x_1$ and the ordinate difference $\Delta y = y_N - y_1$ between the $N^{th}$ track point and the first track point comprises:

determining the type of stroke as the horizontal stroke if $\Delta x \neq 0$ and $\Delta y = 0$, or $\Delta x > 0$ and $0 < |\Delta y/\Delta x| \leq \alpha_1$;

determining the type of stroke as the vertical stroke if $\Delta x = 0$ and $\Delta y \neq 0$, or $\Delta y > 0$ and $0 < |\Delta x/\Delta y| \leq \alpha_1$;

determining the type of stroke as the left-falling stroke if $\Delta x < 0$, $\Delta y > 0$ and $\alpha_1 < |\Delta y/\Delta x| \leq \alpha_2$;

determining the type of stroke as the right-falling stroke if $\Delta x > 0$, $\Delta y > 0$ and $\alpha_1 < |\Delta y/\Delta x| \leq \alpha_2$; and determining the type of stroke as the lifting stroke if $\Delta x > 0$, $\Delta y < 0$ and $\alpha_1 < |\Delta y/\Delta x| \leq \alpha_2$;

where $\alpha_1$ and $\alpha_2$ respectively represent a first stroke threshold and a second stroke threshold.

14. The handwriting processing method according to claim 13, wherein the first stroke threshold $\alpha_1$ is in a range between 0.2 and 0.3, and the second stroke threshold $\alpha_2$ is in a range between 3 and 3.9.

15. The handwriting processing method according to claim 1, further comprising: smoothing the writing track after the shape of the start position of the stroke is determined based on an anti-aliasing method.

16. The handwriting processing method according to claim 1, wherein the determining, according to the sample point in the writing track that is input by the user by means of the touch display, a group of track points comprises:

sampling a touch on a working surface of the touch display to obtain a plurality of sample points; and interpolating based on the plurality of sample points by a Bezier curve fitting algorithm to obtain a plurality of interpolation points, wherein the group of track points comprises the plurality of sample points and the plurality of interpolation points.

17. The handwriting processing method according to claim 16, wherein the coordinate parameter of each of the plurality of sample points is a coordinate point of the sample point in a coordinate system on the working surface of the touch display, and the time parameter of the sample point is an absolute value of the time at which the track point at the sample point occurs; and the coordinate parameter of each of the plurality of interpolation points is determined based on coordinate values of two nearest sample points at both sides of the interpolation point and a position of the interpolation point relative to the two nearest interpolation points, and the time parameter of the interpolation point is determined based on the time parameters of the two nearest sample points at both sides of the interpolation point and the position of the interpolation point relative to the two nearest interpolation points.

18. A computer device, comprising a memory, a processor and a computer program stored in the memory and executable on the processor, wherein the processor, when executing the computer program, implements the handwriting processing method according to claim 1.

19. A non-transitory computer-readable storage medium having stored thereon a computer program, wherein the computer program, when executed by a processor, implements the method according to claim 1.

20. A touch display device, comprising:
an acquisition unit configured to determine, according to a sample point in a writing track that is input by a user by means of a touch display, a group of track points and a related parameter of each track point, the related parameter comprising a coordinate parameter and a time parameter;
a determinator configured to determine, according to the related parameter of each track point, a start position, an end position, and a type of a stroke contained in the writing track, where the type of the stroke comprises one of a horizontal stroke, a vertical stroke, a left-falling stroke, a right-falling stroke or a lifting stroke; and
a setter configured to determine, according to the type of the stroke, a shape of the start position of the stroke.

* * * * *